(12) United States Patent
Miyamoto et al.

(10) Patent No.: US 6,205,098 B1
(45) Date of Patent: Mar. 20, 2001

(54) OPTICAL REPRODUCTION METHOD AND OPTICAL INFORMATION APPARATUS

(75) Inventors: Harukazu Miyamoto, Brisbane, CA (US); Hideki Saga, Kokubunji; Seiji Yonezawa, Hachioji, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/142,023
(22) PCT Filed: Mar. 1, 1996
(86) PCT No.: PCT/JP96/00501
§ 371 Date: Aug. 31, 1998
§ 102(e) Date: Aug. 31, 1998
(87) PCT Pub. No.: WO97/32303
PCT Pub. Date: Sep. 4, 1997

(51) Int. Cl.$^7$ .................................................. G11B 7/00
(52) U.S. Cl. ............................. 369/54; 369/47; 369/116
(58) Field of Search ............................... 369/54, 53, 58, 369/47, 48, 49, 50, 59, 116, 13

(56) References Cited

U.S. PATENT DOCUMENTS 5,625,611 * 4/1997 Yokota et al. ..................... 369/53 X
5,982,714 * 11/1999 Koda ................................. 369/54 X

* cited by examiner

Primary Examiner—Muhammad Edun
(74) Attorney, Agent, or Firm—Antonelli, Terry, Stout & Kraus, LLP

(57) ABSTRACT

An objective is to provide a technique capable of reproducing high-density recorded fine recording marks with excellent high output and excellent quality. To this end, with the present invention, light 501 is irradiated intermittently to an optical recording medium changeable in optical nature due to irradiation of light, permitting a differential amplifier 503 to perform differential processing of a signal as obtained by detection of reflection light rays at at least two time points during irradiation of the intermittent light to thereby obtain a reproduction signal. It is thus possible to effectively detect only a signal component of certain part whereat the reflection light is changed due to light irradiation during irradiation of the intermittent light, which in turn enables reproduction of fine record information with increased resolution while enabling suppression of those components other than the change component. This makes it possible to obtain a reproduction signal with good quality.

11 Claims, 6 Drawing Sheets

OPTICAL REPRODUCTION METHOD AND OPTICAL INFORMATION APPARATUS

TECHNICAL FIELD

The present invention relates to techniques for optically reproducing information.

BACKGROUND ART

FIG. 2 shows one exemplary configuration of a magneto-optical recording/reproduction device which is one of prior known optical record/playback devices. Laser light emitted from a laser 311 mounted on an optical head 3 is collimated by a collimator lens 312 into parallel rays of light, which are guided via a beam splitter 324 to a lens 321 that forms a light spot 21 on a magnetooptical recording medium 8. The position of the light spot 21 on the magnetooptical recording medium 8 is controllable by movement of the lens 321 and optical head 3 under control of an optical spot scan control means 63. Reflection light from the magnetooptical recording medium 8 is guided by the beam splitter 324 toward a photodetector means 33. A reproduction signal from the photodetector 33 is processed by a reproduction circuit 93 for conversion to reproduction data. These overall reproduction operations are under control of a controller 55.

As a method for reproducing information as recorded in high density using the optical record/reproduction device, a magnetic super-resolution reproduction method is proposed in, for example, Published Unexamined Japanese Patent Application Nos. 3-93058 and 3-93056, which method utilizes a temperature increase within a light spot during reproduction to reconstruct information corresponding to such temperature increase part, or to reproduce information of those portions other than the temperature increased part in the spot.

In this case, certain light of substantially constant intensity was continuously irradiated as the reproduction light. Alternatively, as disclosed in JP-A-56-37834, pulsed light was irradiated at extra high frequencies. With such an arrangement, however, the pulsed light irradiation is effectively equivalent to continuous light irradiation because of the fact that the repeat frequency of such pulses is as high as several hundreds of megahertz or greater so that both the temperature on the recording medium and a reproduction output obtainable from reflection light are hardly responsive to a reproduction output of the pulsed light.

DISCLOSURE OF INVENTION

The prescribed prior art is encountered with a problem of inability to reproduce or play back any high-density record information because of a decrease in effective reproduction signal quality due to the fact that only part of the information of a light spot contributes to reproduction during playback of high-density record signals, thereby reducing the resultant reproduction signal output.

It is therefore an object of the present invention to provide a technique capable of avoiding the problem and of reproducing high-density recorded fine record marks at excellently high output with enhanced quality.

To attain the foregoing object the present invention employs specific means as will be set forth below.

When an optical recording medium is irradiated with light for reproduction of information on the optical recording medium by use of reflection light of the light, light is irradiated intermittently or alternatively in the form of pulses to detect reflection rays at at least two time points during irradiation of such intermittent light, thus obtaining a reproduction signal through mutual processing of resultant detection signals.

Whereby, it becomes possible to detect only a change in reflection light during irradiation of the reflection light, which in turn makes it possible to obtain a high signal output while enabling suppression of those portions other than such change component, thus obtaining a reproduction signal of excellent quality.

Additionally, it is also preferable that reproduction is done while causing the optical recording medium to reversibly change or vary in optical nature by irradiation of intermittent light.

It is thus possible to read, as a signal, only a change component of reflected detection light only at specific part whereat the optical nature was altered due to irradiation of intermittent light, which in turn leads to achievement of reproducibility with increased resolution.

Preferably, the reversible change in optical nature of the optical recording medium makes use of those caused by a change in temperature of the optical recording medium due to the intermittent light.

With such an arrangement, a significant change of reflected detection light is obtainable before and after irradiation of the intermittent light, thus obtaining an increased signal output.

It is also preferable that a series of intermittent light rays may be comprised of at least two light pulses.

The stability of reproduction light is thus improved obtaining good reproduction signal quality.

The invention provides a device at least having light irradiation means for irradiating light to an optical recording medium, and photodetection means for detecting reflection light of the light, and further having optical modulation means for recurrently irradiating light intermittently, first synch extraction means for extracting an output from the photodetection means in a way synchronized with the intermittent light, and second synch extraction means for extracting an output from the photodetection means at a time point different by a fixed time duration from that of the first synch detection means, wherein processor means is provided for performing operational processing of the outputs of the first synch detection means and the second synch detection means.

An extraction time difference between the first synch detection means and the second synch detection means may be shorter than a time period of irradiation of the intermittent light.

With these arrangements, it becomes possible to detect only a change component of the reflection light during irradiation of the same intermittent light, thus obtaining a high signal output while enabling suppression of those other than such change component, which leads to an ability to obtain a reproduction signal of excellent quality.

In an optical record/reproduction device at least having light irradiation means for irradiating light to an optical recording medium, and photodetection means for detecting reflection light of the light, the device is arranged to at least have optical modulation means for recurrently irradiating light intermittently, delay means for causing an output from the photodetection means to delay for a predetermined time period, processor means for processing the output delayed by the delay means and the output from the photodetection means, and synch extraction means for extracting an output from the processor means in a way synchronized to the intermittent light.

The delay time of the delay means may be less than an irradiation time period of the intermittent light.

With these arrangements, it is possible to detect only a change component of the reflection light during irradiation of the intermittent light, thereby obtaining a high signal output while enabling suppression of those other than such change component; thus, a reproduction signal of excellent quality may be obtained.

Further, the intermittent light irradiation time may be shorter than the irradiation interval of the intermittent light.

This makes it possible to establish an appropriate cooling time of the recording medium to thereby ensure that a temperature change occurs stably, thus reliably obtaining the intended signal.

It is desirable that the intermittent light irradiation time, Tp, satisfies the relation which follows:

$$2\text{ nanoseconds} < Tp < D/v/4,$$

where D is the size of a light spot as formed on the recording medium during reproduction, and v is the velocity or speed of the light spot relative to the optical recording medium.

By letting Tp>2 nanoseconds, it becomes possible to reliably provide a temperature rise of the recording medium, thus rendering the signal stably obtainable. In addition, by setting the irradiation time at a time taken for the spot to move a distance less than or equal to ¼ of the spot diameter, those components of the reflection light other than the signal components become substantially identical at the instants before and after irradiation of light pulses, thereby making it possible to effectively suppress any unnecessary components.

A differential circuit is usable as the processor means. This makes it possible to extract a signal component alone with unnecessary components suppressed, thus obtaining excellent reproduction signal quality.

An operation of the present invention will be explained with reference to FIG. 5.

FIG. 5(c) shows an example of intermittent light 501 to be irradiated in the present invention. Due to the thermal action of the irradiation light, a temperature distribution 502 on an optical recording medium varies as shown in FIG. 5(b). Here, the medium used herein may be the one as taught by JP-A-3-93056 for example, which changes in optical nature at or above a certain temperature (referred to as "mask formation temperature") and renders effectively "invisible" (or masks) the information recorded on the medium (recording magnetic domains).

FIG. 5(a) is a diagram for comparing the visibility of the information on the recording medium at a time point immediately after light irradiation with that at an instant immediately prior to completion of the light irradiation. In the state 92 just before completion of the light irradiation, a significant change is observable at the center of a light spot between the light irradiation startup just-after state 91 and the light irradiation end just-before state 92. This is because a mask is formed at the light spot center due to an increase in temperature. Then, by processing the reproduction signals resulting from these two states, it is possible to detect only a change component of such two states. Here, one example was shown wherein differential processing is done by a differential detector 503.

At this time, since the light spot is slightly moved between the state 91 and the state 92, a change might also be observable in a signal from low temperature part; however, as far as such movement remains less than or equal to ¼ the light spot diameter, such is not optically dividable so that any signal change at low temperature part may be negligible in practical use.

BEST MODES FOR CARRYING OUT THE INVENTION

Some preferred embodiments of the present invention will be shown hereinafter based on embodiments along with a detailed explanation of the principle and operation as well as effect thereof.

<<Embodiment 1>>

Figure 3:
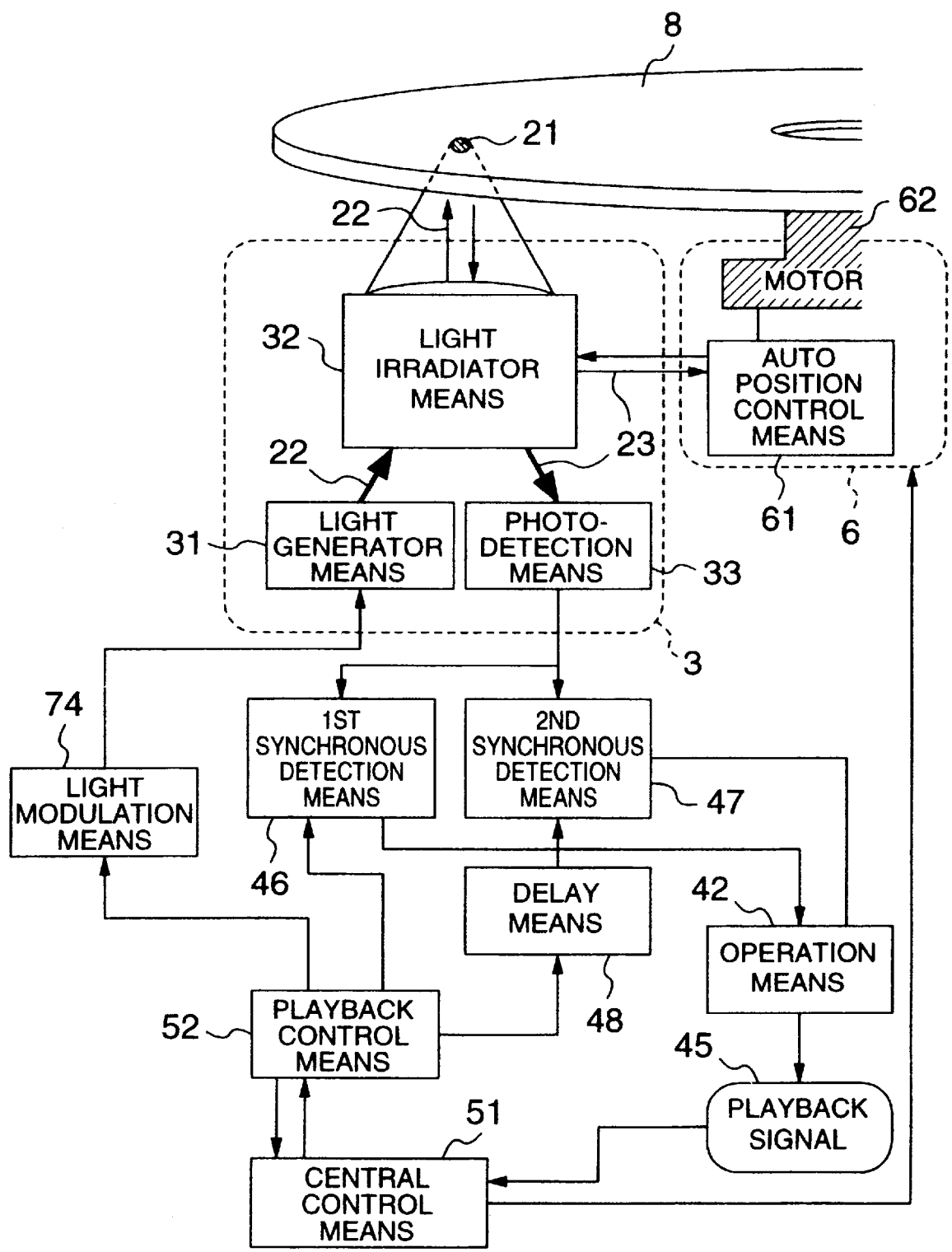
FIG. 3 is a block diagram of one embodiment of the optical recording device of the present invention.

One exemplary configuration of the optical recording device of the instant invention is shown in FIG. 3. In the illustrative embodiment a semiconductor laser of 680 nm wavelength was employed as a light generator means 31. The semiconductor laser is controlled in intensity by an optical modulator means 74 for intermittent irradiation. The light generator means 31 emits rays of light 22, which are collected by a light irradiator means 32 to be focused on the optical recording medium 12. In this example the light irradiator means 32 consists essentially of at least one lens. The aperture ratio of an objective lens for use in collecting light onto the optical recording medium 8 was set at 0.55. Due to this, the resultant light spot 21 on the optical recording medium 8 is 1.1 μm in diameter.

The light spot is controlled by a scan means 6 so that the spot is movable to a given position on the optical recording medium 8. In this embodiment the scan means 6 is arranged to at least have a motor 62 for rotation of the disk-shaped magneto-optical recording medium 8, and an automatic position control means 61 with automatic focussing control and automatic tracking functionality. The automatic position control means 61 performs feedback control by utilizing reflection light 23 from the magnetooptical recording medium 8. In this example, reflection light from the light spot 21 is guided by a polarized light beam splitter provided in the light irradiator means 32 toward a photodetector means 33. The photodetector means 33 is comprised of a polarized light analyzer means, such as a light polarizer, and a photodetector device for converting light into a corresponding electrical signal.

In the illustrative embodiment the intensity of light being irradiated during reproduction of information is intensity-controlled by the optical modulator means to thereby provide intermittent light that exhibits illumination for 3 nanoseconds and becomes inoperative for 18 nanoseconds at the most inner disk periphery (the linear velocity is about 10 m/s). This irradiation period is substantially inverse-proportional to the linear velocity: one exemplary intermittent light is such that 3-nanosecond irradiation and 7-nanosecond pause are provided at the most outer disk periphery (linear velocity is 20 m/s or more or less). In this example the irradiation time (3 nanoseconds) was designed to remain constant irrespective of the linear velocity. This allows the optical recording medium 8 to be kept almost constant in peak temperature thereon during reproduction, thereby enabling effectuation of the intended reproduction under the same condition with respect to the inner and outer peripheries.

In this embodiment the "sample servo" scheme was employed to match the timing of light irradiation with optical record information on the medium. More specifically, clock markings or "marks" for use in generating clocks are preformed on the disk with a predefined distance or interval defined between adjacent ones of such marks. During reproduction the intermittent light is irradiated in a way synchronized to such reproduced clocks obtainable by multiplication of a reproduction signal from this clock mark. Generation of this timing is performed by a reproduction control means 52. In this example a change remains less of those rays of reflected light coming from certain part other than the portions at which the optical characteristics are changed by reproduction light before and after light irradiation because the light spot's travel distance on the disk during light irradiation is 0.03 μm at the inner periphery and 0.06 μm at the outer periphery, each of which is sufficiently smaller than ¼ of the diameter of light spot.

The resulting electrical signal converted by the photodetector means is supplied to a first synch extractor means 46 and a second synch extractor means 47, which are operable to extract therefrom a reflection light output immediately after irradiation of the intermittent light (after elapse of about 0.5 ns from the initiation of irradiation) and that immediately prior to completion of such irradiation (after elapse of about 2.5 ns from the start of irradiation). These two extracted signals are forwarded to a processor means 42 which performs mutual operational processing between them, obtaining a reproduction signal 45. Note that while the operational processing employed herein is principally a differential operation, it will be desirable that slight gain adjustment is done between the two extracted signals in view of possible deterioration of the frequency characteristics in the reproduction system.

Figure 5:
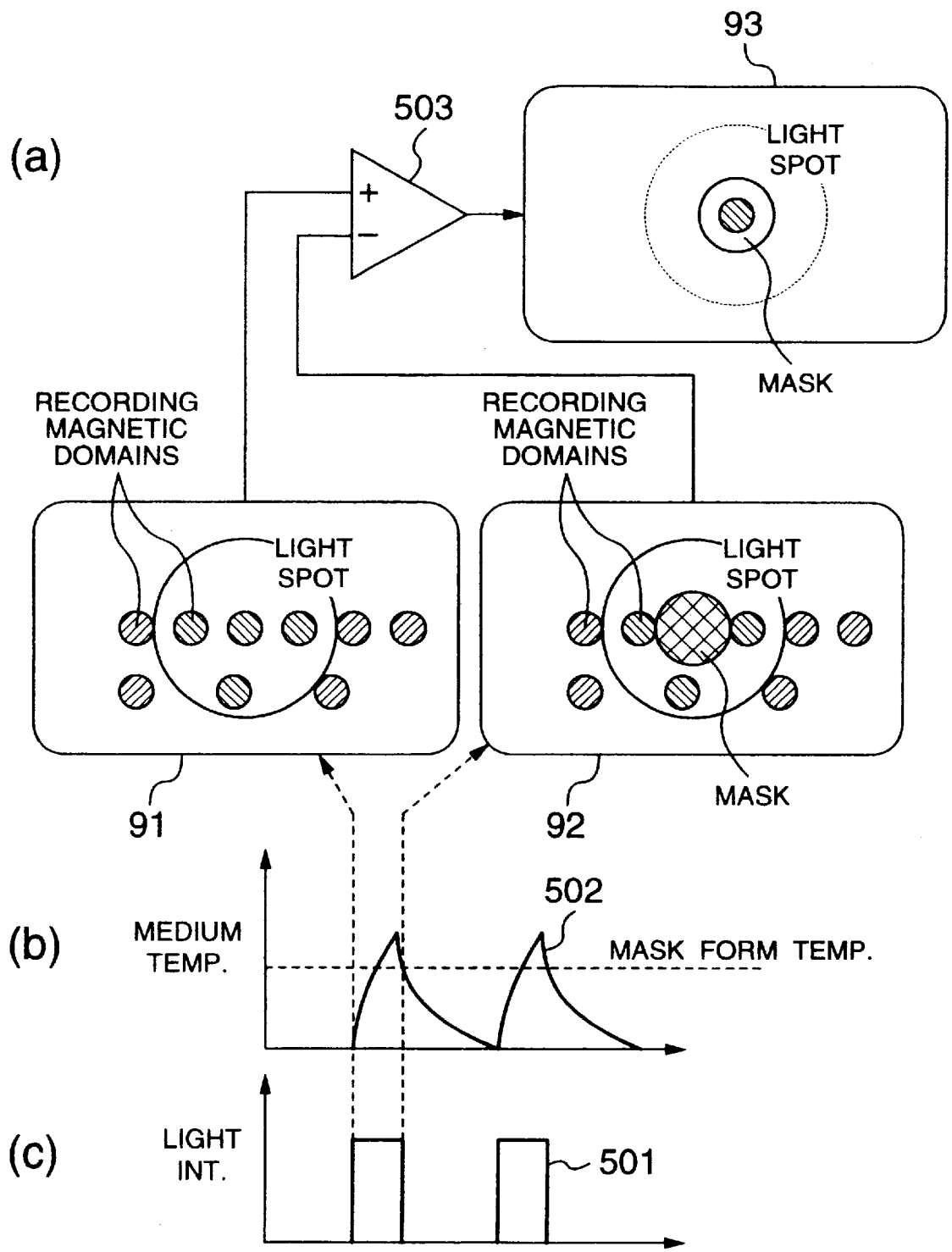
FIG. 5 is a diagram showing the principle of the present invention.

In the illustrative embodiment a medium of the magnetic superresolution type was used as the optical recording medium, which has a three-layer lamination of magnetic films made of TbFeCo, DyFeCo, and GdFeCo. This medium stores information in the TbFeCo recording layer in the form of recording magnetic domains, wherein at room temperatures the magnetic domains of the TbFeCo record layer have been transferred to the GdFeCo playback layer via the DyFeCo intermediate layer, thereby enabling the information to be read out of the playback layer side. On the other hand, at high temperatures, magnetization of the DyFeCo intermediate layer can disappear causing magnetic domains of the GdFeCo playback layer to likewise disappear due to action of a bias magnetic field as created during reproduction. Accordingly, when looking at from the playback layer side, this medium behaves to let the Kerr rotation angle be zero at high temperatures. In other words, the optical nature can change or vary at high temperatures. For this reason, applying the optical recording medium of this type to the illustrative embodiment makes it possible to detect only a changed part or component of a high-temperature section at the light spot center between the state 91 immediately after startup of light irradiation and the state 92 just before termination of such light irradiation as shown in FIG. 5, which in turn enables successful provision of the intended reproduction signal that is high in resolution and excellent in quality.

Figure 4:
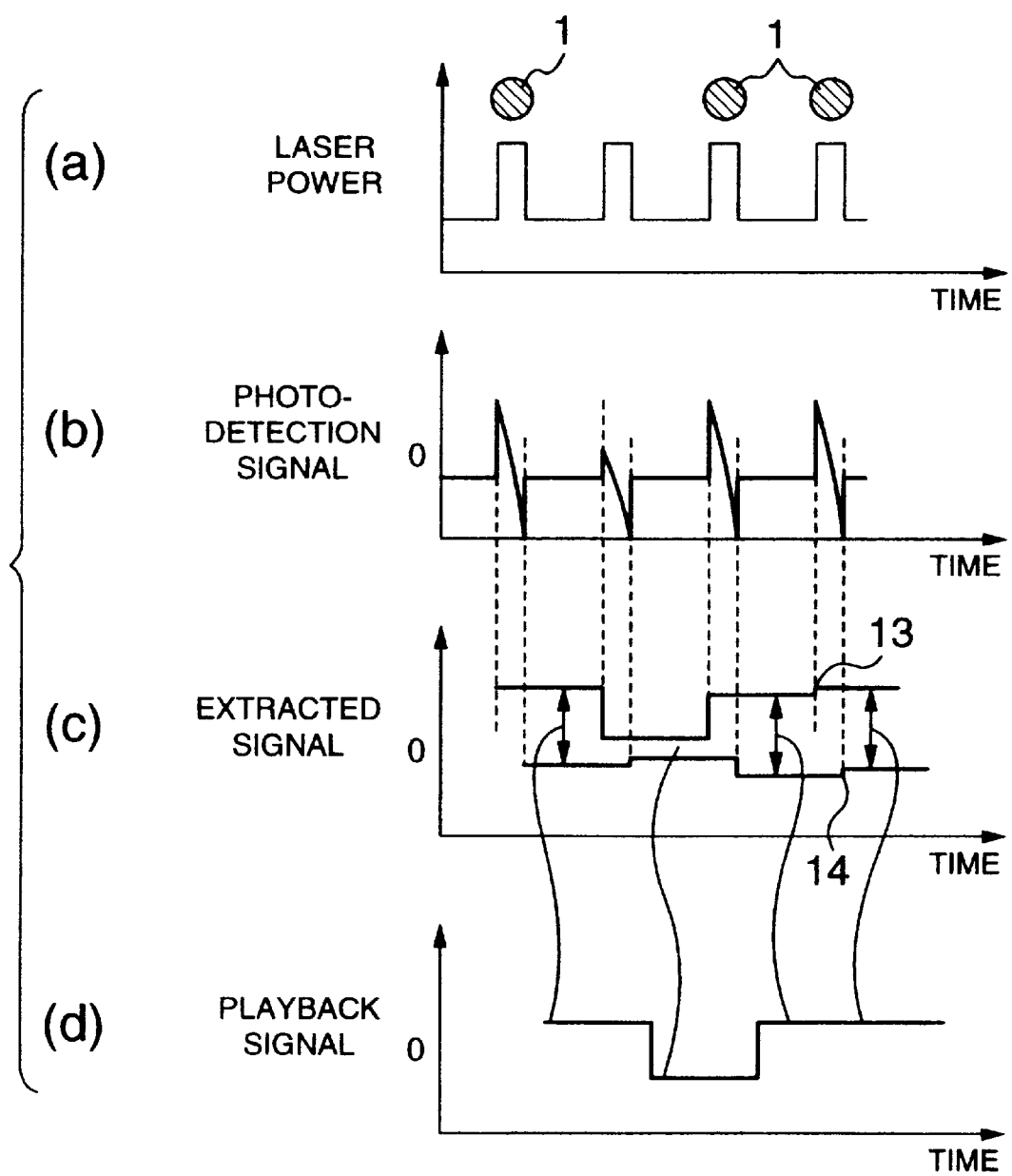
FIG. 4 is a waveform diagram showing an operation of one embodiment of the optical recording device of the present invention.

An operation of the present invention will be explained in more detail with reference to FIG. 4 below. When casting intermittent light upon certain part whereat the recording magnetic domains exist in the manner as shown in FIG. 4(a), a photodetection signal obtained has its waveform shown in FIG. 4(b). A rightward ramp-down signal change shown in FIG. 4(b) may reflect the manner that the dimension or size of a mask varies with a change in temperature on the medium. When extracting (holding) from such signal both a detection signal just after the light irradiation startup and a detection signal just before the light irradiation termination by use of the device shown in FIG. 3, extraction signals are obtainable as shown in FIG. 4(c). By applying differential operational processing to these extracted signals, a reproduction signal may be obtained as shown in FIG. 4(d).

At this time the signal output is variable, and stair-step-like differences 13, 14 were observed in the resulting extraction signals of FIG. 4(c); however, such step-like differences disappeared in FIG. 4(d). This is because various kinds of noise components occurring due to reproduction signals obtained from portions other than the mask sections are cancelled out through the differential operational processing. Thus, signal quality enhancement is achievable.

When using the device of the present invention to reproduce 0.2 μm long magnetic domains recorded by magnetic field modulation techniques, presence and absence of such recording magnetic domains could be identified for reproduction at an error rate of approximately 2/100000. ore specifically, 0.2 μm/bit high-density recording was attainable. Furthermore, even when reproduction of magnetic domains as recorded at a track pitch of 0.5 μm was carried out using the device of the present invention, no particular increase was seen in error rate. In other words, narrow track reproduction with 0.5 μm track pitch was enabled.

In summary, use of the device embodying the present invention has enabled achievement of high-density recording with 6.4 gigabits per square inch.

<<Embodiment 2>>

Figure 1:
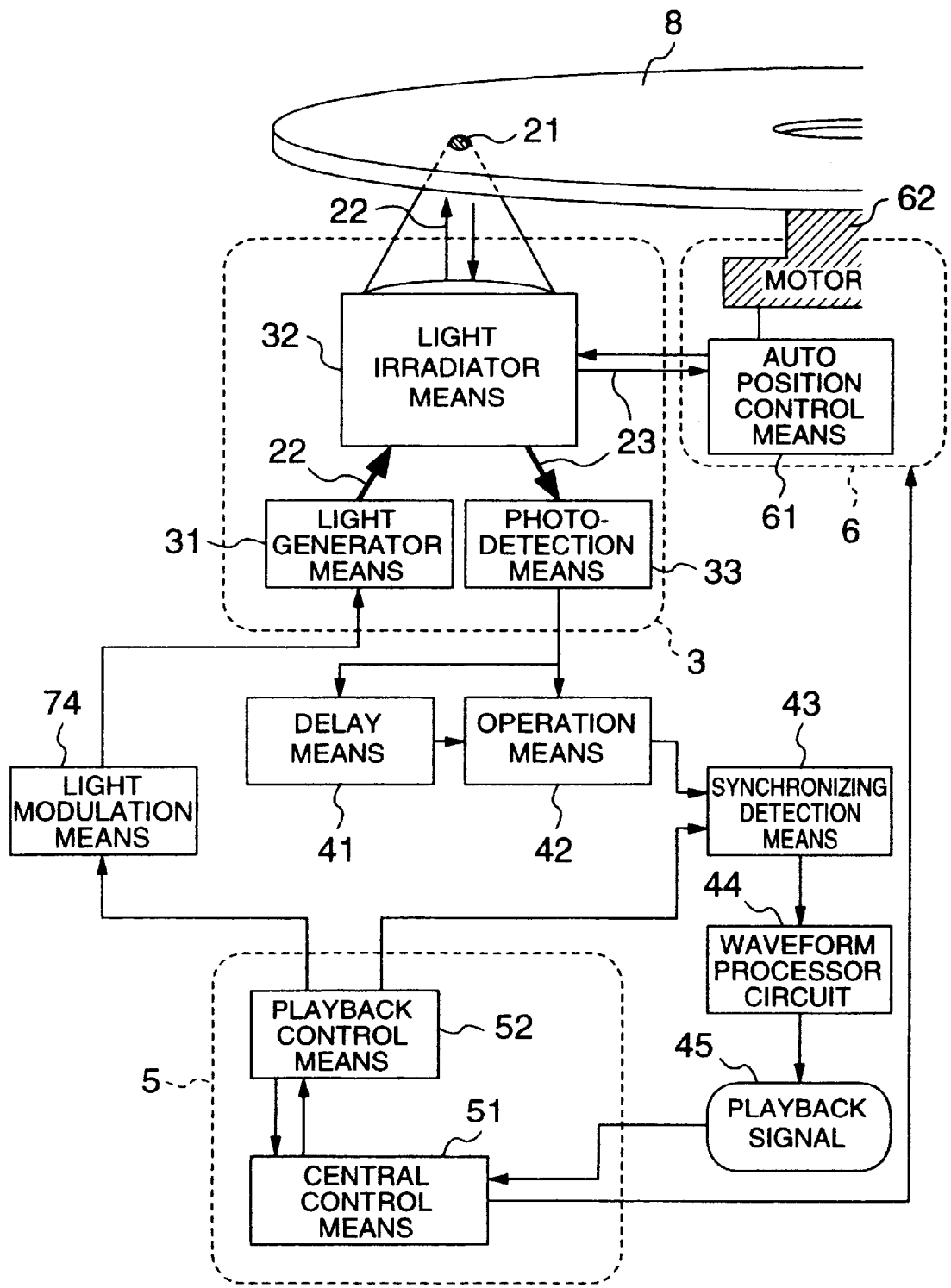
FIG. 1 is a block diagram of one embodiment of an optical recording device of the present invention.
Figure 2:
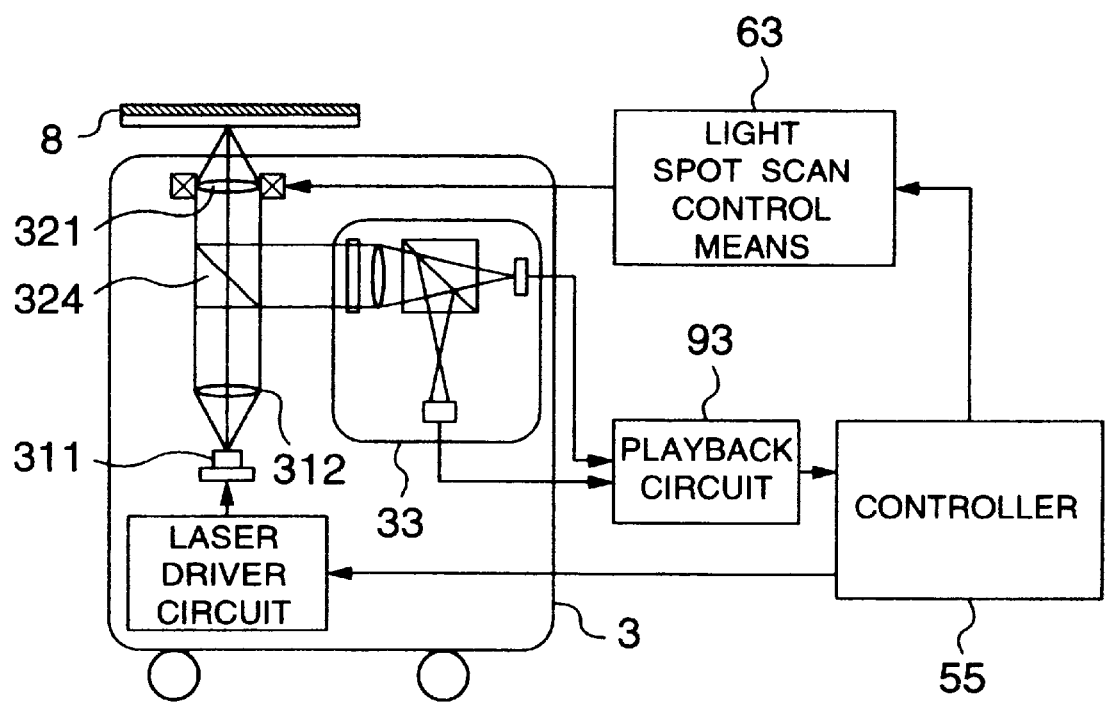
FIG. 2 is a diagram showing a configuration of one typical prior art optical recording device.

An example of a configuration of the optical recording device of the present invention is depicted in FIG. 1. In this embodiment a semiconductor laser of 680 nm wavelength was employed as the light generator means 31. The intensity of such semiconductor laser is controllable by an optical modulator means 71. Light 22 emitted from the light generator means 31 is collected by a light irradiator means 32 to be focused on an optical recording medium 12. In this example the light irradiation means 32 consists essentially of at least one lens. In this example an objective lens for use in collecting light on the optical recording medium 8 was 0.6 in aperture ratio. Accordingly, a light spot 21 on the optical recording medium 8 is 1.0 μm in diameter. The light spot is movable to a given position on the optical recording medium 8 under control of a scan means 6. In this example, reflection light from the light spot 21 is guided toward a photodetector means 33, by a polarized light beam splitter provided in the light irradiation means 32. The photodetector means 33 includes a polarized light analyzer means such as for example a polarizer, and a photodetective element for changing light to an electrical signal.

In the illustrative embodiment the intensity of light being irradiated during reproduction of information is controlled by an optical modulator means 74 under control of a reproduction control means 52, thereby providing intermittent light of 4-nanosecond emission/6-nanosecond pause. In this embodiment, constant linear velocity control techniques such as CLV, ZCLV and the like were employed to ensure that the disk's linear velocity is constantly kept at 5 m.

Accordingly, light is irradiated every time the light spot moves a distance of about 0.05 μm; during light irradiation, the light spot travels about 0.02 μm. These travel distance values are sufficiently smaller than the size of information recorded.

An electrical signal converted by the photodetector means is subdivided into two portions, one of which is delayed by a delay means 41 for approximately 2.5 ns and is then subject to differential operational processing with the other at the processor means 42. In this case also, while the processing may basically be differential operational processing, it is desirable that gain adjustment is done between two extracted signals in view of any possible deterioration of the reproduction system's frequency characteristics. Of those processed outputs, only one or ones originated from the processing of signals during light irradiation are synchronically extracted by a synch extractor means 43, and are then sent forth to a waveform processor means 44 such as for example low-pass filter, thereby obtaining a reproduction signal 45.

In this embodiment the optical recording medium used was a magnetooptical medium having a two-layer lamination of magnetic films made of TbFeCo and GdFe. This medium stores, in its TbFeCo record layer, information in form of recording magnetic domains, wherein the magnetic domains of the TbFeCo record layer have been transferred to the GdFeCo playback layer at room temperatures thus enabling information to be read from this playback layer side. On the other hand, at high temperatures, approach to the GdFe playback layer's Curie temperature causes the Kerr rotation angle to decrease. In other words the optical nature can change or vary at high temperatures. Consequently, applying this optical recording medium to the device embodying the present invention leads to an ability to detect only changed part of a high temperature section at the light spot center between the light irradiation startup just-after state 91 and the light irradiation end just-before state 92 as shown in FIG. 5, which in turn renders obtainable the intended reproduction signal high in resolution and excellent in quality. The medium used in this embodiment features in that it does no longer require any bias magnetic field during reproduction.

When using this embodiment device to reproduce the 1–7 modulation-recorded magnetic domains of 0.24 μm in length which have been recorded on the medium by optical modulation techniques using divided pulses, it was possible to identify for reproduction the presence and absence of record magnetic domains at a reduced error rate of approximately $2/100000$. This may be reworded in a way such that high linear density recording of 0.18 μm per bit was enabled. Further, even where the device embodying the present invention is used to perform reproduction of certain magnetic domains that have been simultaneously recorded at both grooves and intergroove "land", each of which has the width of 0.6 μm, any particular increase in error ratio was not observed. This well demonstrates that 0.6 μm narrow track pitch reproduction was achieved.

It may thus be summarized that the use of the device embodying the invention enabled high-density recording of about 6 gigabits per square inch.

<<Embodiment 3>>

An explanation will now be given of another example of the optical recording device in accordance with the present invention. The basic block form of the device may be similar to that shown in FIG. 1; accordingly, characteristic part thereof will be explained in conjunction with FIG. 1.

Figure 6:
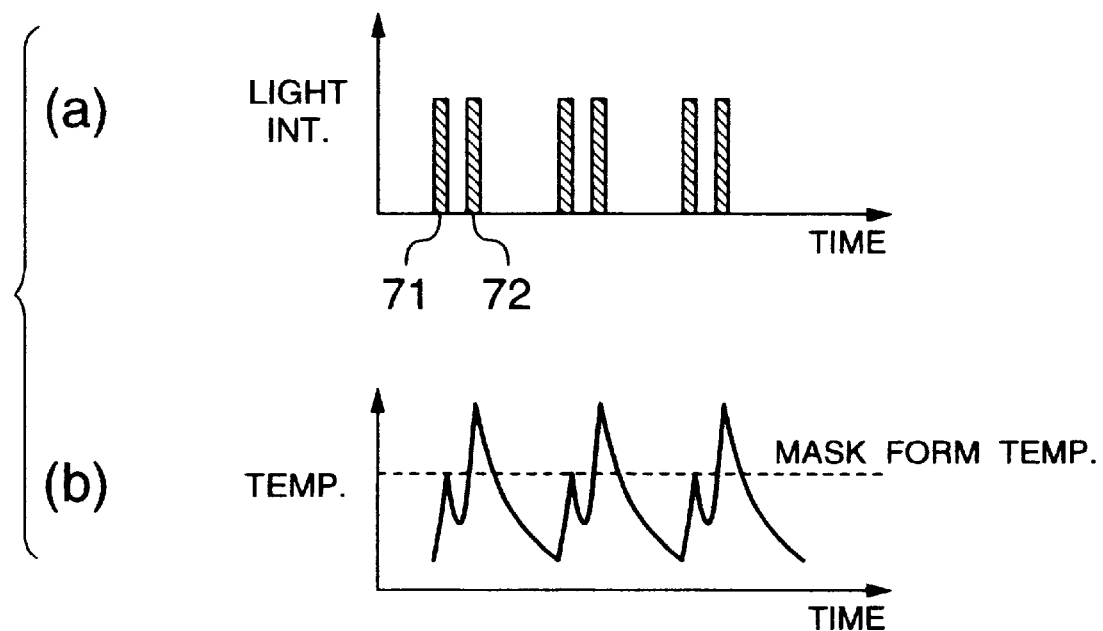
FIG. 6 is a waveform diagram showing the operation principle of one embodiment of the present invention.

In this embodiment, divided pulse light shown in FIG. 6 was employed as the intermittent light. More specifically, light irradiation was done so that two light pulses, each 1 nanosecond wide, were irradiated with a period of 2.5 nanoseconds and then an intermission was provided for a time period corresponding to the widths of two pulses. Thus, the total period as a whole is 10 nanoseconds. In th is embodiment the constant linear velocity control techniques such as CLV, ZCLV or the like are employed to ensure that the disk's linear velocity is kept constantly at about 5 m. With such an arrangement, light is irradiated every time the light spot moves a distance of about 0.0125 μm. The travel distance remains sufficiently less than the size of information recorded.

An electrical signal as converted by the photodetector means is divided into two portions, one of which is delayed by the delay means 41 for about 2.5 ns and is then subject at the processor means 42 to differential operational processing with the other one. At this stage also, the processing used herein is differential operational processing, in this respect, it is desirable that gain adjustment is done between two extracted signals by taking account of any possible deterioration of the reproduction system's frequency characteristics. Of those resulting processed outputs, only one or ones originated from the processing of signals during light irradiation are synchronically extracted by a synch extractor means 43, and are then supplied to a waveform processor means 44 such as for example a low-pass filter, thus obtaining a reproduction signal 45.

In the subject embodiment a specified medium of the phase-change superresolution type was employed as the optical recording medium, which has a phase changeable film and stores information based on a surface configuration. When this embodiment device was used to reproduce bit edge record marks that have been recorded by 2–7 modulation techniques to measure 0.24 μm in minimum length, the intended reproduction was accomplished at a reduced error ratio of $2/100000$, or more or less. It was thus possible to achieve 0.16 μm/bit high linear density recording. Further, when narrow track reproduction of 0.7 μm track pitch is done using the device of the invention, high density recording was enabled of about 6 gigabits per square inch.

It is noted that the optical recording medium employable in the present invention should not exclusively be limited to the magnetooptical recording medium using the multilayer film structure and single-layered magnetooptical recording medium as well as phase-changeable medium, and any other media may be employed which are changeable in optical nature at light irradiation sections thereof by utilization of a temperature rise or the like on the media, such as for example those containing therein organic pigments or the like. In such cases also, the advantages unique to the invention is still obtainable.

INDUSTRIAL APPLICABILITY

According to the present invention, a reproduction signal is obtainable by intermittently irradiating light to an optical recording medium of the type which changes or alters in optical nature due to irradiation of light and by performing mutual operational processing of those signals that are obtained by detection of rays of reflection light at at least two time points during irradiation of such intermittent light. With such an arrangement, it is possible to successfully detect only the "pure" signal components at portions whereat the reflection light has changed due to irradiation of light during the intermittent light irradiation, thereby enabling reproduction of any fine or "micro" record information with enhanced resolution while simultaneously enabling suppression of those components other than change components, which in turn leads to an ability to obtain a reproduction signal excellent in quality.

What is claimed is:

1. An optical reproduction method for reproducing information from regions on the optical recording medium where an optical nature of the optical recording medium in the regions is changed by irradiation of light to the optical recording medium during reproduction and using reflected light of said irradiated light, characterized in that a reproduced signal is obtained by intermittently irradiating the light to a respective region of the optical recording medium as at least one light pulse providing a spot size less than a size of said region, detecting reflected light at at least two times during irradiation of the intermittently irradiated light to said region to obtain signals, and executing mutual operational processing of the signals to reproduce the information.

2. The optical reproduction method according to claim 1, characterized in that reproduction is done while causing the optical recording medium to reversibly change in optical nature due to irradiation of said intermittent light.

3. The optical reproduction method according to claim 2, characterized in that the reversible change in optical nature of said optical recording medium is caused by a temperature change of the optical recording medium due to said intermittent light.

4. The optical reproduction method according to any one of the preceding claims 1 to 3, characterized in that said intermittent light comprises at least two light pulses during the irradiation of said region.

5. An optical reproduction device for reproducing information from an optical recording medium comprising light irradiation means for irradiating light to the optical recording medium, photodetection means for detecting reflected light from the optical recording medium, optical modulation means for recurrently irradiating the intermittent light, first synchronous detection means for detecting an output from said photodetection means in synchronism with intermittent light, second synchronous detection mean for detecting an output from said photodetection means at timing different by a predefined time interval from the timing of said first synchronous detection means, and operation means for executing operational processing of the outputs of said first synchronous detection means and said second synchronizing detection means to enable reproduction of the information.

6. The optical reproduction device according to claim 5, characterized in that a difference between the detection timing of said first synchronous detection means and said second synchronous detection means is less than an irradiation period of said intermittent light.

7. An optical reproduction device for reproducing information from an optical recording medium comprising light irradiation means for irradiating light on the optical recording medium, photodetection means for detecting reflected light, optical modulation means for irradiating said light intermittently and iteratively, delay means for delaying an output of said photodetection means for a predetermined time period, operation means for processing the output delayed by said delay means and the output from said photodetection means, and synchronous detection means for detecting an output from said processor means in synchronization with the intermittent light to enable reproduction of the information.

8. The optical reproduction device according to claim 7, characterized in that the delay time of said delay means is less than an irradiation period of said intermittent light.

9. The optical reproduction device according to any one of the preceding claims 5 to 8, characterized in that the irradiation period of said intermittent light is less than a nonirradiation period of said intermittent light.

10. The optical reproduction device according to any one of the preceding claims 5 to 8, characterized in that the irradiation period Tp of said intermittent light satisfies the following relation:

$$2\ \text{nanoseconds} < Tp < D/v/4,$$

where D is the size of a light spot formed on the medium during reproduction, and v is the travel speed of the light spot relative to the optical recording medium.

11. The optical reproduction device according to any one of the preceding claims 5 to 8, characterized in that said operation means is a differential circuit.

* * * * *